(12) United States Patent
Guo et al.

(10) Patent No.: US 12,294,119 B2
(45) Date of Patent: *May 6, 2025

(54) BATTERY AND POWER CONSUMING DEVICE HAVING THE SAME

(71) Applicant: Ningde Amperex Technology Limited, Ningde (CN)

(72) Inventors: Peipei Guo, Ningde (CN); GuoWen Zhang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,838

(22) Filed: Dec. 29, 2023

(65) Prior Publication Data

US 2024/0136679 A1  Apr. 25, 2024

Related U.S. Application Data

(63) Continuation of application No. 16/650,488, filed as application No. PCT/CN2020/074482 on Feb. 7, 2020, now Pat. No. 11,901,590.

(51) Int. Cl.
*H01M 50/586* (2021.01)
*H01M 50/109* (2021.01)
(Continued)

(52) U.S. Cl.
CPC ....... *H01M 50/586* (2021.01); *H01M 50/109* (2021.01); *H01M 50/186* (2021.01);
(Continued)

(58) Field of Classification Search
CPC ........... H01M 2220/30; H01M 50/109; H01M 50/186; H01M 50/528; H01M 50/54; H01M 50/586; H01M 50/593
See application file for complete search history.

(56) References Cited

U.S. PATENT DOCUMENTS

| 6,083,639 A | 7/2000 | McHugh et al. |
| 2012/0196166 A1 | 8/2012 | Kim |

(Continued)

FOREIGN PATENT DOCUMENTS

| CN | 103999259 A | 8/2014 |
| CN | 204289638 U | 4/2015 |

(Continued)

OTHER PUBLICATIONS

Search Report for Korean Patent Application No. KR20207009402 mailed Feb. 3, 2022.

(Continued)

*Primary Examiner* — Matthew T Martin
*Assistant Examiner* — Unique Jenevieve Luna
(74) *Attorney, Agent, or Firm* — Maier & Maier, PLLC

(57) ABSTRACT

A battery includes a battery cell and a casing assembly for receiving the battery cell. The battery cell includes a first electrode tab. The battery further includes an insulating member and a conductive member, the insulating member is connected between the casing assembly and the conductive member. The casing assembly defines a first through hole, and the insulating member defines a second through hole connected to the first through hole. The first electrode tab is electrically connected to the conductive member. A power consuming device including the battery is further provided. The conductive member of the present disclosure substitutes for the terminal post of existing art, increasing the energy density of the battery.

22 Claims, 9 Drawing Sheets

(51) Int. Cl.
*H01M 50/186* (2021.01)
*H01M 50/528* (2021.01)
*H01M 50/54* (2021.01)
*H01M 50/593* (2021.01)

(52) U.S. Cl.
CPC ......... *H01M 50/528* (2021.01); *H01M 50/54* (2021.01); *H01M 50/593* (2021.01); *H01M 2220/30* (2013.01)

(56) References Cited

U.S. PATENT DOCUMENTS

| | | |
|---|---|---|
| 2015/0079431 A1 | 3/2015 | Kim et al. |
| 2019/0103625 A1 | 4/2019 | Haraguchi et al. |
| 2019/0305286 A1 | 10/2019 | Takabayashi et al. |
| 2019/0363331 A1 | 11/2019 | Wakimoto et al. |
| 2020/0112000 A1 | 4/2020 | Kwag |
| 2020/0227693 A1 | 7/2020 | Enomoto |

FOREIGN PATENT DOCUMENTS

| | | |
|---|---|---|
| CN | 204596909 U | 8/2015 |
| CN | 106560936 A | 4/2017 |
| CN | 207381439 U | 5/2018 |
| CN | 109192889 A | 1/2019 |
| CN | 208336402 U | 1/2019 |
| CN | 109546018 A | 3/2019 |
| CN | 109659483 A | 4/2019 |
| CN | 110048037 A | 7/2019 |
| CN | 209199997 U | 8/2019 |
| DE | 102018200159 A1 | 7/2019 |
| JP | S56156666 A | 12/1981 |
| JP | H06248102 A | 9/1994 |
| JP | 2014026865 A | 2/2014 |
| JP | 2019029225 A | 2/2019 |
| JP | 2019046639 A | 3/2019 |
| JP | 2019-087341 A | 6/2019 |
| KR | 20160091616 A | 8/2016 |
| KR | 20170039908 A | 4/2017 |
| KR | 20180121169 A | 11/2018 |
| WO | 2019/025235 A1 | 2/2019 |
| WO | 2019205640 A1 | 10/2019 |

OTHER PUBLICATIONS

Extended European Search Report for EP application No. 20712824.0, dated Jun. 28, 2021.
Second Office Action of Chinese Patent Application No. 202080000174.1, mailed Aug. 23, 2023.
Written Decision on Registration of Korean Patent Application No. 10-2023-7017381, mailed Jun. 27, 2023.
Decision to grant a patent of Japanese Patent Application No. 2020-518626, mailed Jul. 18, 2023.
First Office Action of Chinese Patent Application No. 202080000174.1, mailed Dec. 1, 2022.
First Office Action of Indian Patent Application No. 202017012853, mailed Sep. 15, 2022.
Notice of Rejection of Japanese Patent Application No. 2020-518626, mailed Jan. 17, 2023.
Extended European Search Report of EP Application No. 20712824.0, mailed Jun. 28, 2021.
First Office Action of Japanese Patent Application No. 2020-518626, mailed May 10, 2022.
Second Office Action of Japanese Patent Application No. 2020-518626, mailed Sep. 13, 2022.
First Office Action of Korean Patent Application No. 2020-7009402, mailed Jan. 27, 2022.
Second Office Action of Korean Patent Application No. 2020-7009402, mailed Jun. 22, 2022.
International Search Report of Application No. PCT/CN2020/074482, mailed Nov. 10, 2020.

BATTERY AND POWER CONSUMING DEVICE HAVING THE SAME

CROSS-REFERENCE TO RELATED APPLICATIONS

This application is a continuation application of U.S. patent application Ser. No. 16/650,488, filed on Mar. 25, 2020, which is a National Stage Entry of International Patent Application No. PCT/CN2020/074482, filed on Feb. 7, 2020. The contents of the aforementioned patent applications are incorporated herein by reference in their entireties.

TECHNICAL FIELD

The disclosure relates to a battery and a power consuming device having the battery.

BACKGROUND

Batteries are widely used in portable electronic devices due to their portability. A battery usually includes a casing, a top cover, and a battery cell. The battery cell is received in the casing. The top cover is fixed in a top opening of the casing. A terminal post is fixed in the top cover, and electrically connected to the battery cell to supply electric power to outside components.

However, to meet the installation requirements, an existing terminal post is shaped like a letter "I", that is, the terminal post may include a post body and two post plates disposed at opposite sides of the post body. The two post plates are secured to opposite surfaces of the top cover. To electrically insulate the terminal post from the top cover, an insulating pad is disposed between each of the post plates and the top cover. Thus, along a direction perpendicular to the top cover, there are four layers, including the two post plates and the two insulating pads, which are additionally added on the top cover, resulting in an increase of the total thickness of the top cover. The increased thickness further results in a loss of energy density.

BRIEF DESCRIPTION OF THE DRAWINGS

Implementations of the present disclosure will now be described, by way of embodiments, with reference to the attached figures.

Figure 1:
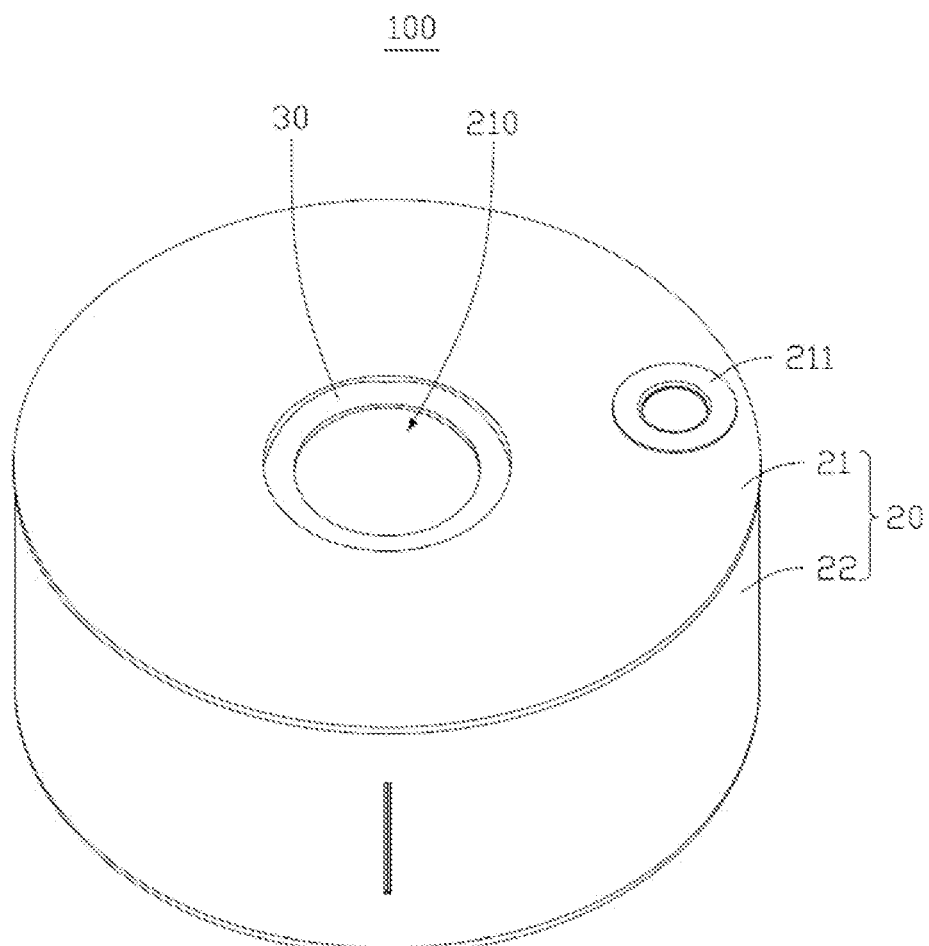
FIG. 1 is a perspective view of an embodiment of a battery according to the present disclosure.

Description of symbols for main elements: 1 represents a power consuming device, 10 represents a battery cell, 11 represents a first electrode plate, 12 represents a second electrode plate, 20 represents a casing assembly, 21 represents a second casing, 22 represents a first casing, 22a represents a bottom portion, 22b represents a sidewall, 30 represents an insulating member, 40 represents a conductive member, 100 and 200 represent a battery, 101 represents a first electrode tab, 102 represents a second electrode tab, 210 represents a first through hole, 211 represents a filling plug, 220 represents a receiving space, 300 represents a second through hole, $T_1$, $T_2$, or $T_3$ represents a thickness, and $W_1$, $W_2$, or $W_3$ represents a width.

Implementations of the disclosure will now be described, with reference to the drawings.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are not to be considered as limiting the scope of the embodiments.

Implementations of the disclosure will now be described, byway of embodiments only, with reference to the drawings. It should be noted that non-conflicting details and features in the embodiments of the present disclosure may be combined with each other.

FIG. 1 to FIG. 4 illustrate an embodiment of a battery 100 including a battery cell 10 and a casing assembly 20 for receiving the battery cell 10. The battery cell 10 includes a first electrode tab 101. The battery 100 further includes an insulating member 30 and a conductive member 40. The insulating member 30 is connected between the casing assembly 20 and the conductive member 40. The casing assembly 20 defines a first through hole 210. The insulating member 30 defines a second through hole 300 connected to the first through hole 210. The first electrode tab 101 is electrically connected to the conductive member 40.

Since the present disclosure electrically connects the first electrode tab 101 to the conductive member 40, the polarity of the first electrode tab 101 may be guided out of the casing assembly 20 when an external conductor is connected to the conductive member 40. Therefore, the conductive member 40 may be substituted for an existing terminal post. Compared to a conventional battery which adds four layers on its casing assembly when a terminal post is applied, the present disclosure only adds two layers, the insulating member 30 and the conductive member 40, on the casing assembly 20. That is, a thickness of the casing assembly 20 is reduced. While a total size of the battery 100 remains unchanged, the energy density of the battery 100 is increased. Furthermore, this arrangement avoids electrode plates of the battery 100 being pierced by the terminal post during a crush test. Thus, a short circuit is avoided.

Referring to FIGS. 1 to 4, the conductive member 40 covers the second through hole 300 and seals the battery cell 10 in the casing assembly 20. In other embodiments, the conductive member does not cover the second through hole. The battery is sealed by other components.

Figure 3:
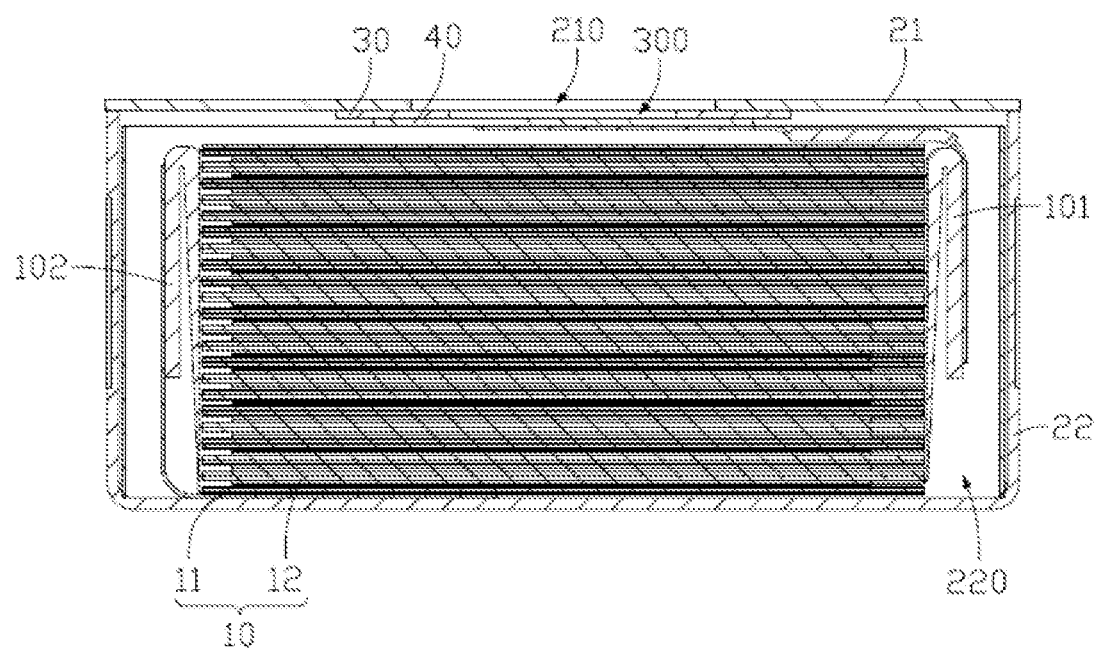
FIG. 3 is a cross-sectional view of the battery of FIG. 1.

Referring to FIG. 3, in the embodiment, the conductive member 40 is adhered to the casing assembly 20 through the insulating member 30. That is, the insulating member 30 not only electrically insulates the conductive member 40 from the casing assembly 20, but also adhesively connects the conductive member 40 to the casing assembly 20. Thus, the conductive member 40 seals the first through hole 210 of the casing assembly 20 to ensure the tightness of the casing assembly 20.

Furthermore, the insulating member 30 may be made of at least one of polyolefin, polyvinyl chloride, and fluoroelastomer. For example, the insulating member 30 may be made of nonpolar polyolefin and insulating particles dispersed in the nonpolar polyolefin. The insulating particles ensure the insulating property of the insulating member 30. The nonpolar polyolefin may be selected from a group consisting of polyethylene (PE), polypropylene (PP), ethylene propylene diene monomer (EPDM), ethylene propylene rubber (EPR), ethylene-vinyl acetate copolymer (EVA), and any combination thereof. A size of the insulating particles may be in a range from 0.001 mm to 0.3 mm.

In another embodiment, the insulating member 30 may also be connected to the casing assembly 20 through thermal sealing, soldering, or injection molding. The conductive member 40 may also be connected to the insulating member 30 through soldering.

Referring to FIG. 3, in the embodiment, the insulating member 30 and the conductive member 40 are disposed inside of the casing assembly 20. Thus, a flat shape of the case assembly 20 may be obtained, and the appearance of the battery 100 is more regular. Furthermore, since there is a height difference between the conductive member 40 and a top surface of the case assembly 20, an external short circuit is avoided. In this embodiment, the external conductor can pass through the first through hole 210 and the second through hole 300, and then connect to the conductive member 40. As such, the polarity of the first electrode tab 101 may be guided out of the casing assembly 20.

Figure 5:
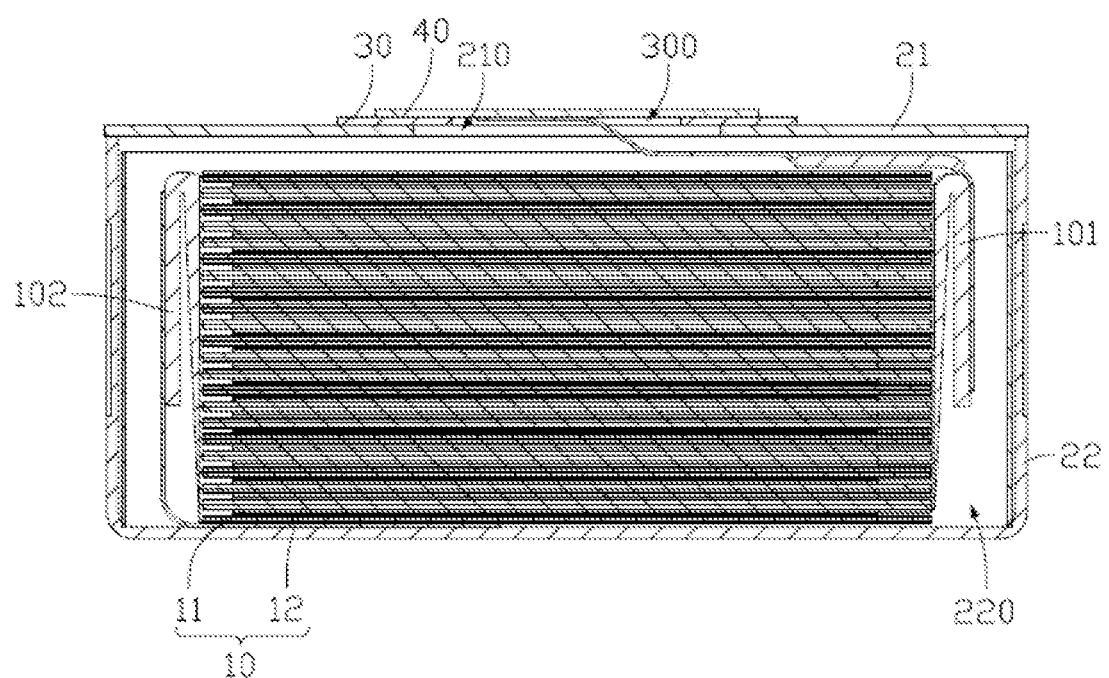
FIG. 5 is a cross-sectional view of the battery of FIG. 1 in another embodiment.

Referring to FIG. 5, in another embodiment, the insulating member 30 and the conductive member 40 are disposed outside of the casing assembly 20. The battery 100 may generate gas in the casing assembly 20 during a normal operation, which results in an increase of internal pressure. When the internal pressure exceeds a predetermined value, the conductive member 40 is pushed away and separated from the casing assembly 20 to achieve pressure relief. The battery 100 exploding is thus avoided to ensure the safety of the battery 100. In this embodiment, the first electrode tab 101 can pass through the first through hole 210 and the second through hole 300, and then connect to the conductive member 40. When the external conductor is connected to the conductive member 40, the polarity of the first electrode tab 101 may be guided out of the casing assembly 20.

Figure 4:
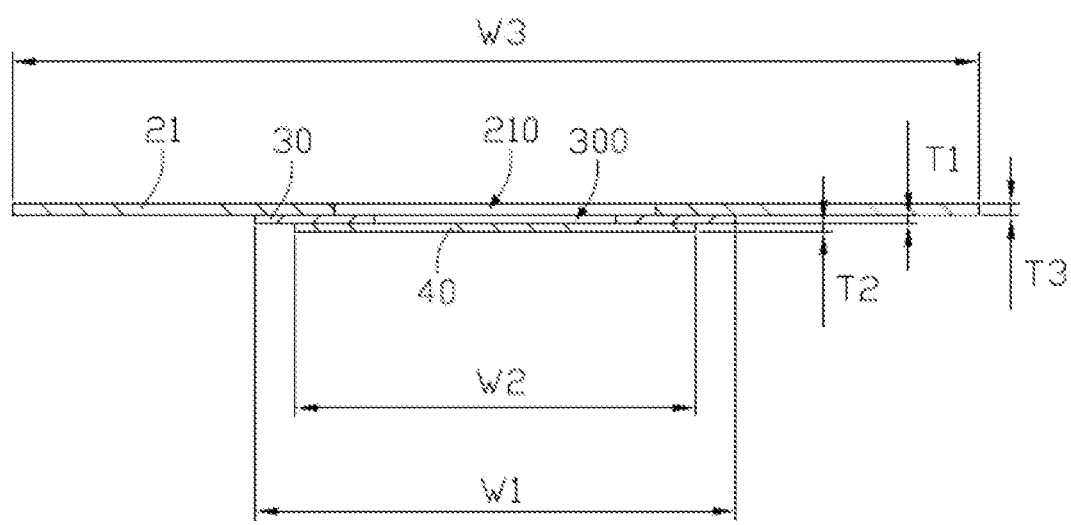
FIG. 4 is a cross-sectional view of a second casing, an insulating member, and a conductive member of the battery of FIG. 3.

Referring to FIG. 4, in the embodiment, a thickness $T_1$ of the insulating member 30 is in a range from 0.01 mm to 0.3 mm. For example, the thickness $T_1$ may be 0.15 mm. A thickness $T_2$ of the conductive member 40 is in a range from 0.1 mm to 2 mm. For example, the thickness $T_2$ may be 0.15 mm. Since the thicknesses of the insulating member 30 and the conductive member 40 are small, a total thickness of the battery 100 is reduced.

Furthermore, a width $W_1$ of the insulating member 30 and a width $W_2$ of the conductive member 40 are each not more than 1000 mm. The width $W_2$ of the conductive member 40 may be less than the width $W_1$ of the insulating member 30. The insulating member 30 and the conductive member 40 are substantially flat and extend along two planes parallel to each other. The width $W_1$ is defined as being along any direction on the plane of the insulating member 30. The width $W_2$ is defined as being along the same direction on the plane of the conductive member 40.

In the embodiment, the insulating member 30 may be circular, square, oval, triangular, or polygonal. The conductive member 40 may also be circular, square, oval, triangular, or polygonal. The shape of the insulating member 30 may be the same as that of the conductive member 40, or may also be different from that of the conductive member 40.

The conductive member 40 may be made of a metal. For example, the conductive member 40 may be made of steel alloy, aluminum alloy, iron alloy, copper alloy, or nickel alloy. For example, the conductive member 40 may be made of iron-carbon alloy (i.e., stainless steel) or aluminum.

Referring to FIG. 3, in the embodiment, the casing assembly 20 includes a first casing 22 and a second casing 21. The first casing 22 defines a receiving space 220 for receiving the battery cell 10. The second casing 21 is connected to the first casing 22 to close the receiving space 220. The first through hole 210 is defined on the second casing 21. In this embodiment, the insulating member 30 is connected between the second casing 21 and the conductive member 40.

Furthermore, the width $W_1$ of the insulating member 30 may be smaller than a width $W_3$ of the second casing 21. The second casing 21 is substantially flat and extends along a plane parallel to the insulation member 30. The width $W_1$ is defined as being along any direction on the plane of the insulating member 30. The width $W_3$ is defined as being along the same direction on the plane of the second casing 21.

Figure 6:
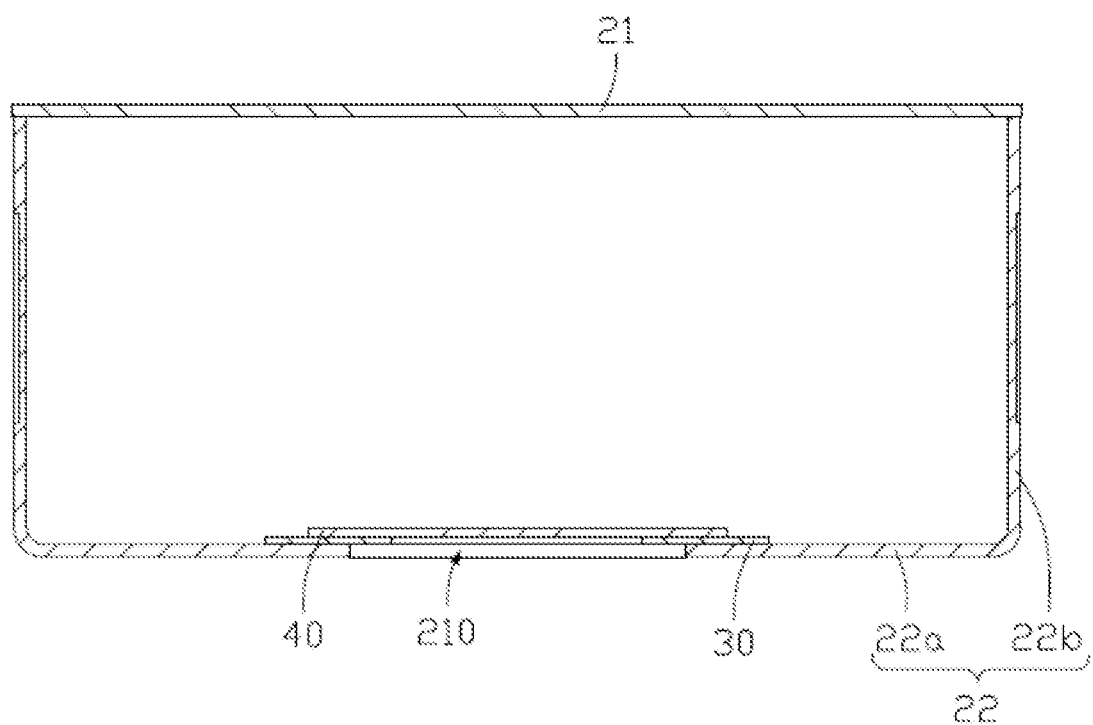
FIG. 6 is a cross-sectional view of a casing assembly of the battery of FIG. 1 in another embodiment.
Figure 7:
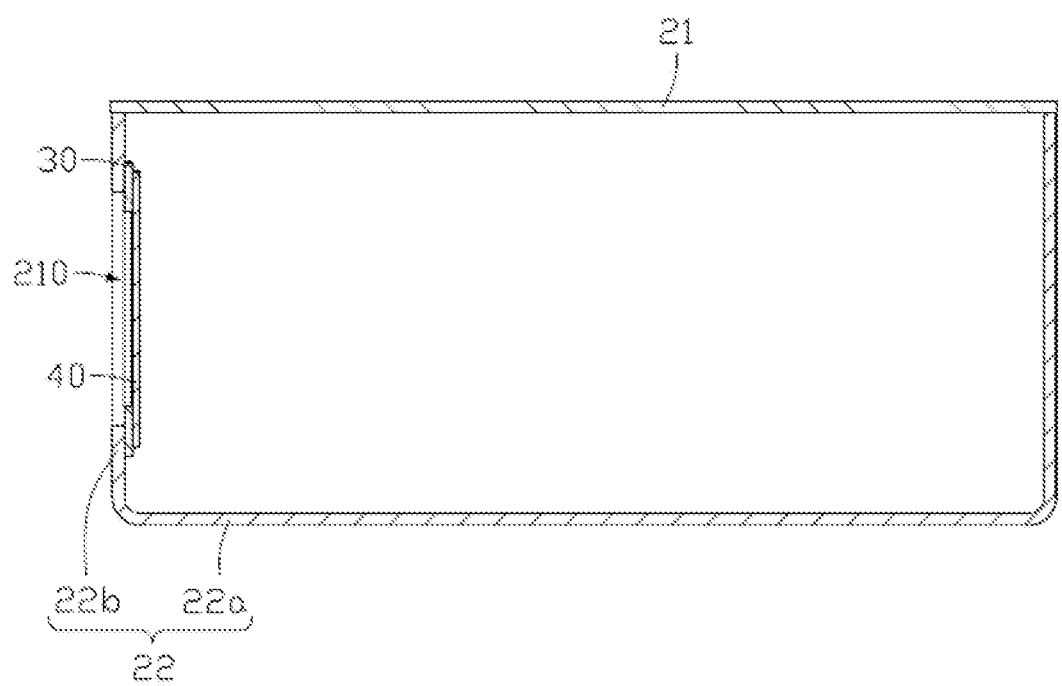
FIG. 7 is a cross-sectional view of a casing assembly of the battery of FIG. 1 in yet another embodiment.

Referring to FIGS. 6 and 7, in another embodiment, the first through hole 210 may also be disposed at any position of the first casing 22. In this embodiment, the insulating member 30 is connected between the first casing 22 and the conductive member 40. The first casing 22 includes a bottom portion 22a and a sidewall 22b surrounding the bottom portion 22a. The second casing 21 is opposite to the bottom portion 22a of the first casing 22. Referring to FIG. 6, the first through hole 210 may be disposed at the bottom portion 22a of the first casing 22. Referring to FIG. 7, the first through hole 210 may also be disposed at the sidewall 22b of the first casing 22.

The first casing 22 may be made of a metal. For example, the first casing 22 may be made of steel alloy, aluminum alloy, iron alloy, copper alloy, or nickel alloy. For example, the first casing 22 is made of stainless steel. The first casing 22 may also be made of a plastic which is resistant to electrolyte corrosion. For example, the first casing 22 may be made of polystyrene (PS), polypropylene (PP), polyethylene (PE), polyester (PET), polyvinyl chloride (PVC), polyimide (PI), acrylonitrile-butadiene-styrene plastic (ABS), polycarbonate (PC), or polyamide (PA). For example, the first casing 22 is made of polypropylene. The first casing 22 may also be made of ceramic material.

The second casing 21 may be made of a metal. For example, the second casing 21 may be made of steel alloy, aluminum alloy, iron alloy, copper alloy, or nickel alloy. For example, the second casing 21 is made of stainless steel. The second casing 21 may also be made of a plastic which is resistant to electrolyte corrosion. For example, the second casing 21 may be made of polystyrene, polypropylene, polyethylene, polyester, polyvinyl chloride, polyimide, acrylonitrile-butadiene-styrene plastic, polycarbonate, or polyamide. For example, the second casing 21 is made of polypropylene. The second casing 21 may also be made of ceramic material.

The cross-sections of the first casing 22 and the second casing 21 may be circular, square, oval, triangular, or polygonal.

During manufacture, the first casing 22 and the second casing 21 may be cut into a desired shape by laser cutting or machine tool processing. The first casing 22 may also be formed by punching to form a recess (i.e., the receiving space). The first casing 22 and the second casing 21 may be connected together by soldering or snap-fitted together.

In the embodiment, the battery 100 may be a button battery. The first casing 22 and the second casing 21 are made of stainless steel. The first casing 22 and the second casing 21 are connected together by soldering.

Furthermore, a width of the first casing 22 is not more than 1000 mm, and a height of the first casing 22 is not more than 1000 mm. Referring to FIG. 4, the width $W_3$ of the second casing 21 is not more than 1000 mm, and a thickness $T_3$ of the second casing 21 is not more than 100 mm.

Referring to FIG. 4, in the embodiment, a central axis of the second through hole 300 is aligned with a central axis of the first through hole 210, and a projection of the second through hole 300 on the second casing 21 is entirely disposed in the first through hole 210. In another embodiment, the projection of the second through hole 300 on the second casing 21 may also cover the first through hole 210.

In another embodiment, the central axis of the second through hole 300 is not aligned with the central axis of the first through hole 210, and the projection of the second through hole 300 on the second casing 21 is entirely disposed in the first through hole 210 or covers the first through hole 210.

Figure 2:
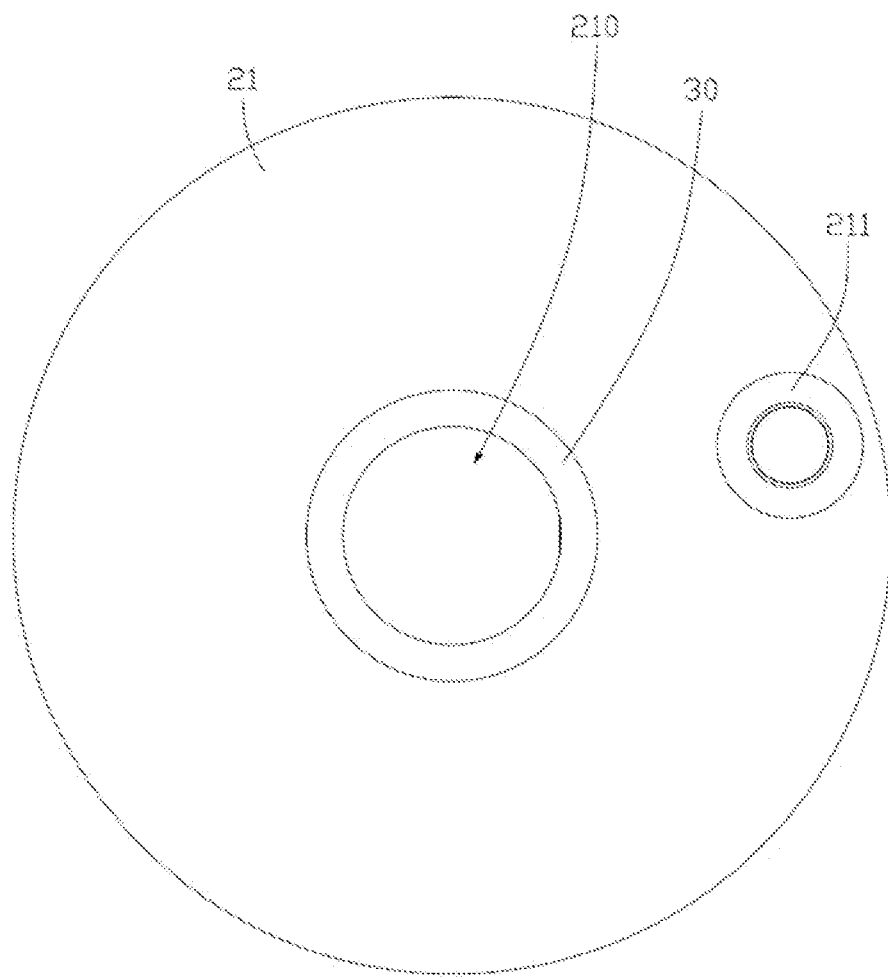
FIG. 2 is a top view of the battery of FIG. 1.

Referring to FIG. 1 and FIG. 2, in the embodiment, the first through hole 210 and the second through hole 300 are circular, and a diameter of each of the first through hole 210 and the second through hole 300 is not more than 100 mm. For example, the diameter of each of the first through hole 210 and the second through hole 300 is nearly 12 mm. Furthermore, since the conductive member 40 covers the second through hole 300, the width $W_2$ of the conductive member 40 is greater than the diameter of the second through hole 300. Moreover, the width $W_1$ of the insulating member 30 is greater than the diameter of the first through hole 210. In other embodiments, the first through hole 210 and the second through hole 300 are not limited to being circular, and may also be square, oval, triangular, or polygonal.

Referring to FIG. 3 and FIG. 5, in the embodiment, the battery cell 10 further includes a second electrode tab 102 having a polarity opposite that of the first electrode tab 101. The second electrode tab 102 is electrically connected to the first casing 22. When the first casing 22 and the second casing 21 are connected together by soldering, the entire casing assembly 20 may have a polarity the same as that of the second electrode tab 102. Since the first electrode tab 101 is electrically connected to the conductive member 40, the conductive member 40 can have a polarity the same as that of the first electrode tab 101. Since the conductive member 40 and the second casing 21 are electrically insulated from each other by the insulating member 30, the conductive member 40 and the casing assembly 20 may have opposite polarities.

In this embodiment, the first electrode tab 101 is a positive electrode tab, and the second electrode tab 102 is a negative electrode tab. The second electrode tab 102 may be electrically connected to the first casing 22 by soldering, and the first electrode tab 101 may be electrically connected to the conductive member 40 by soldering.

In another embodiment, the second electrode tab 102 may also be electrically connected to the second casing 21, which also allows the conductive member 40 and the casing assembly 20 to have opposite polarities.

Referring to FIG. 3 and FIG. 5, in the embodiment, the battery cell 10 further includes a first electrode plate 11 and a second electrode plate 12. The first electrode tab 101 and the second electrode tab 102 are electrically connected to the first electrode plate 11 and the second electrode plate 12, respectively. In detail, the first electrode plate 11 includes a first current collector and a first active material layer disposed on the first current collector. The second electrode plate 12 includes a second current collector and a second active material layer disposed on the second current collector. The first electrode tab 101 and the second electrode tab 102 are respectively electrically connected to the first current collector and the second current collector through soldering. The first electrode plate 11 and the second electrode plate 12 are stacked together to form the battery cell 10. An isolation film (not shown) may be further disposed between the first electrode plate 11 and the second electrode plate 12.

Referring to FIG. 1 and FIG. 2, in at least one embodiment, the second casing 21 includes a liquid injection hole (not shown). A liquid electrolyte may be injected into the battery through the liquid injection hole. A filling plug 211 is disposed in the liquid injection hole. The filling plug 211 seals the liquid injection hole, avoids leakage of the electrolyte, and prevents external impurities from entering the battery 100. The liquid injection hole can also be defined on the first casing 22.

Figure 8:
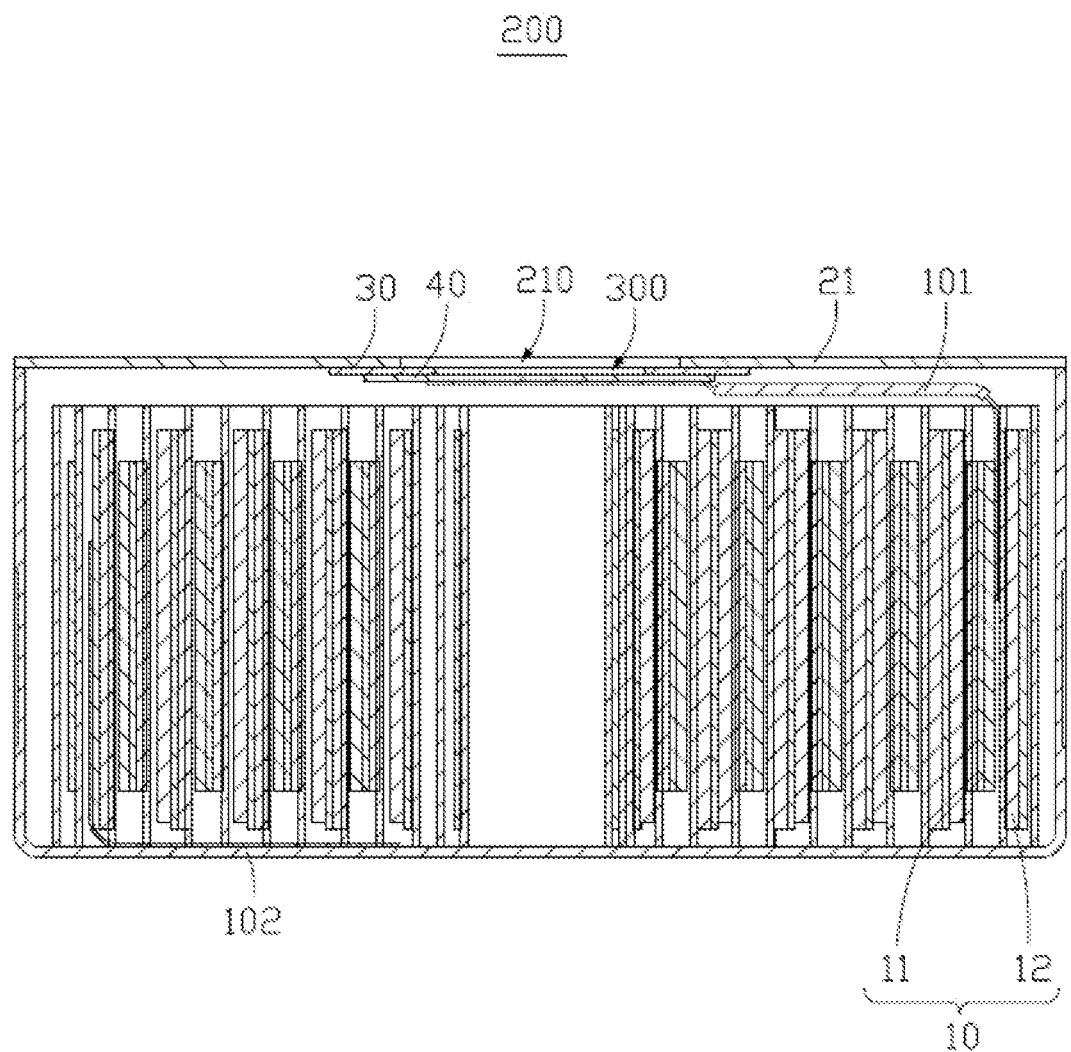
FIG. 8 is a cross-sectional view of the battery in yet another embodiment.

Referring to FIG. 8, the present disclosure further provides another embodiment of a battery 200. Different from the battery 100, the battery 200 is of the wound type. That is, the first electrode plate 11 and the second electrode plate 12 are wound to form the battery cell 10.

Figure 9:
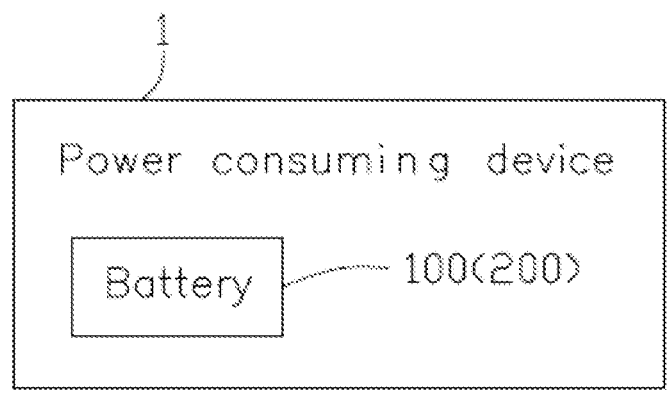
FIG. 9 is a block diagram of an embodiment of a power consuming device according to the present disclosure.

Referring to FIG. 9, the present disclosure further provides a power consuming device 1, which includes the battery 100 or the battery 200. The power consuming device 1 may be a consumer electronic product, such as a smart phone. In other embodiments, the power consuming device 1 may also be an electric tool, an energy storage device, or a power device. For example, the power consuming device 1 may be an electric vehicle.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:
1. A battery, comprising:
a battery cell having a first electrode tab and a second electrode tab, the second electrode tab having a different polarity from the first electrode tab;
a casing assembly, wherein the battery cell is disposed in the casing assembly; and a conductive member being fixed to the casing assembly by a continuous layer of an insulating material, the insulating material being adhesive;

wherein the casing assembly comprises a first casing and a second casing;

the first casing has a bottom portion and a sidewall surrounding the bottom portion, together defining a receiving space for the battery cell;

the second casing is a flat plate, the second casing is connected with the first casing at an edge of the sidewall and covers the receiving space;

a first through hole is provided in the second casing, the bottom portion or the sidewall; and the insulating material has a second through hole, the second through hole overlaps with the first through hole, the conductive member is fixed to a surface of the casing assembly through the insulating material, the conductive member covers the first through hole and the second through hole, and a diameter of the first through hole is greater than a diameter of the second through hole; and the first electrode tab is electrically connected to the conductive member, and the second electrode tab is electrically connected to the bottom portion or the sidewall of the first casing.

2. The battery according to claim 1, wherein the first through hole is provided in the second casing, the insulation material adheres to a surface of the second casing, and the conductive member is fixed to the surface of the second casing through the insulating material.

3. The battery according to claim 2, wherein the insulating material adheres to an inner surface of the second casing and the conductive member is fixed to the inner surface of the second casing through the insulating material.

4. The battery according to claim 2, wherein the insulating material adheres to an outer surface of the second casing, and the conductive member is fixed to the outer surface of the second casing through the insulating material.

5. The battery according to claim 1, wherein the insulating material is located on the bottom portion, the insulation material adheres to a surface of the bottom portion, and the conductive member is fixed to the surface of the second casing through the insulating material.

6. The battery according to claim 5, wherein the insulating material adheres to an inner surface of the bottom portion and the conductive member is fixed to the inner surface of the bottom portion through the insulating material.

7. The battery according to claim 5, wherein the insulating material adheres to an outer surface of the bottom portion, and the conductive member is fixed to the outer surface of the bottom portion through the insulating material.

8. The battery according to claim 1, wherein the first through hole is provided in the sidewall, the insulation material adheres to a surface of the sidewall, and the conductive member is fixed to the surface of the sidewall through the insulating material.

9. The battery according to claim 8, wherein the insulating material adheres to an inner surface of the sidewall and the conductive member is fixed to the inner surface of the sidewall through the insulating material.

10. The battery according to claim 8, wherein the insulating material adheres to an outer surface of the sidewall, and the conductive member is fixed to the outer surface of the sidewall through the insulating material.

11. The battery according to claim 1, wherein the conductive member seals the battery cell in the casing assembly.

12. The battery according to claim 1, wherein the second casing comprises a liquid injection hole.

13. The battery according to claim 1, wherein the insulating material is made of at least one selected from the group consisting of polyolefin, polyvinyl chloride, and fluoro-elastomer.

14. The battery according to claim 13, wherein the insulating material is made of nonpolar polyolefin and insulating particles dispersed in the nonpolar polyolefin.

15. The battery according to claim 1, wherein a thickness of the insulating material layer is in a range from 0.01 mm to 0.3 mm, and a thickness of the conductive member is in a range from 0.1 mm to 2 mm.

16. The battery according to claim 1, wherein a central axis of the second through hole is aligned with a central axis of the first through hole, and a projection of the second through hole on the second casing is entirely located in the first through hole or covers the first through hole.

17. The battery according to claim 1, wherein a central axis of the second through hole is not aligned with a central axis of the first through hole, and a projection of the second through hole on the second casing is entirely located in the first through hole or covers the first through hole.

18. The battery according to claim 1, wherein a width of the conductive member is smaller than a width of the second casing.

19. The battery according to claim 1, wherein the battery cell further comprises a first electrode plate and a second electrode plate, the first electrode tab and the second electrode tab are electrically connected to the first electrode plate and the second electrode plate respectively, and the first electrode plate and the second electrode plate are stacked or wound to form the battery cell.

20. The battery according to claim 1, wherein the first through hole and the second through hole are circular, and a diameter of each of the first through hole and the second through hole is not more than 100 mm.

21. The battery according to claim 1, wherein the bottom portion and the sidewall are integrally disposed.

22. A power consuming device powered by a battery, wherein the battery comprises:

a battery cell having a first electrode tab and a second electrode tab, the second electrode tab having a different polarity from the first electrode tab;

a casing assembly receiving the battery cell, and a conductive member being fixed to the casing assembly by a continuous layer of an insulating material, the insulating material being adhesive;

wherein the casing assembly comprises a first casing and a second casing;

the first casing has a bottom portion and a sidewall surrounding the bottom portion, together defining a receiving space for receiving the battery cell;

the second casing is a flat plate, the second casing is connected with the first casing at an edge of the sidewall and covers the receiving space;

a first through hole is located on the second casing, the bottom portion or the sidewall; and the insulating material has a second through hole, the second through hole overlaps with the first through hole, the conductive member is fixed to a surface of the casing assembly through the insulating material, the conductive member covers the first through hole and the second through hole, and a diameter of the first through hole is greater than the second through hole;

the second through hole is smaller than the first through hole; and the first electrode tab is electrically connected to the conductive member, and the second electrode tab is electrically connected to the bottom portion or the sidewall of the first casing.

\* \* \* \* \*